United States Patent Office 3,799,976
Patented Mar. 26, 1974

3,799,976
PURIFICATION OF TEREPHTHALIC ACID
Hans-Juergen Nienburg and Wolfgang Eisfeld, Ludwigshafen, and Harro Wache, Fussgoenheim, Germany, assignors to Badische Anilin- & Soda-Fabrik Aktiengesellschaft, Ludwigshafen (Rhine), Germany
No Drawing. Filed Sept. 8, 1971, Ser. No. 178,773
Claims priority, application Germany, Sept. 16, 1970, P 20 45 747.0
Int. Cl. C07c 51/42, 63/26
U.S. Cl. 260—525                              7 Claims

ABSTRACT OF THE DISCLOSURE

A process for purifying terephthalic acid (obtained from crude terephthalic acid and containing small amounts of 4-carboxybenzaldehyde and other impurities) by a reductive treatment of an aqueous solution which contains from 5 to 45% by weight of crude terephthalic acid and from 0.003 to 3% by weight of formic acid at elevated temperature and in the presence of a noble metal catalyst of the Eighth Group of the Periodic Table. The aqueous mixture is heated to a temperature of at least 230° C.

---

The invention relates to a process for the reductive purification of terephthalic acid in aqueous solution.

It is known from German laid-open specification No. 1,907,534 that crude terephthalic acid can be heated in the presence of a noble metal catalyst in a liquid medium of water and an inert organic medium at a temperature of at least 275° C. and the purified terephthalic acid separated. In the case of a content of less than 50% by weight of terephthalic acid in the reaction mixture, the liquid medium consists of 0 to 75%, preferably 0 to 20%, by weight of water and from 25 to 100%, preferably from 80 to 100%, by weight of an organic medium such as a hydrocarbon, carboxylic acid or ether. This method is not satisfactory however, particularly on account of the large amount of inert organic medium required.

It is also known from German printed application (DAS) No. 1,299,628 that crude terephthalic acid can be purified using hydrogen in the presence of a noble metal catalyst in aqueous medium. This method is not satisfactory however because (a) the amount of hydrogen is not easy to meter in and excessive hydrogenation may occur and (b) it is necessary to regenerate the catalyst frequently and this is troublesome, especially in a continuous process.

The object of the invention is to obtain from crude terephthalic acid a pure terephthalic acid having a low content of 4-carboxybenzaldehyde and a good color quality. This object is achieved by the invention.

The process for the purification of terephthalic acid from crude terephthalic acid containing a small amount of 4-carboxybenzaldehyde with or without other impurities in accordance with the invention comprises heating an aqueous mixture containing from 5 to 45% by weight of crude terephthalic acid and from 0.003 to 3% by weight of formic acid at a temperature of at least 230° C. in contact with a noble metal of Group VIII of the Periodic Table as catalyst.

Crude terephthalic acid such as is obtained in the oxidation of p-xylene generally contains up to 0.5% by weight, sometimes as much as 1% by weight of 4-carboxybenzaldehyde and other impurities, some of which have not been identified, which lessen the color quality. 4-carboxybenzaldehyde crystallizes isomorphously with terephthalic acid and is therefore difficult to remove by recrystallization.

The aqueous reaction mixtures according to the invention generally contain from 5 to 45%, particularly from 10 to 30%, by weight of terephthalic acid and generally from 0.003 to 3%, particularly from 0.001 to 1%, by weight of formic acid.

These mixtures are heated at temperatures of at least 230° C., generally from 230° to 290° C., particularly from 240° to 275° C. At these temperatures the terephthalic acid passes into solution. The known solubility values for terephthalic acid in water are approximately:

| Grams of terephthalic acid in 100 g. of solution: | Temperature of solution in ° C. |
|---|---|
| 1 | 186 |
| 5 | 227 |
| 10 | 244 |
| 20 | 263 |
| 30 | 273 |
| 40 | 280 |
| 50 | 285 |

The process according to the invention is carried out in the liquid phase. The pressure necessary to maintain the liquid phase at the said temperatures are dependent in known manner on the vapor pressure of the solution.

The mixtures containing crude terephthalic acid, formic acid and water are heated in contact with a catalyst of a noble metal of Group VIII of the Periodic Table or a compound thereof. The following are suitable: osmium, iridium, ruthenium, rhodium and particularly platinum and palladium catalysts. The catalysts are preferably applied to inert carriers, particularly to carbon. The separation of the catalyst after the reductive purification of terephthalic acid is conveniently carried out mechanically, for example by filtration of the hot mixture. It is also possible to place the catalyst in a perforated vessel and to remove this as a whole from the reaction mixture after the reductive purification process. It is particularly advantageous to arrange the catalyst as a fixed bed and to separate the reaction mixture by a conventional method after the purification has taken place.

The amount of catalyst is chosen so that the contact periods necessary for the reductive purification are generally from 0.5 minute to 2 hours, particularly from 1 minute to 1 hour. The amount of catalyst required may easily be ascertained by a simple preliminary experiment. For example amounts of from 0.05 to 0.5% of noble metal with reference to terephthalic acid have proved to be suitable in batch operation.

After the catalyst has been separated, the hot mixture is cooled and the crystallized terephthalic acid is separated, washed and dried by conventional methods.

The process according to the invention may be carried out batchwise or preferably continuously. It is favorable to arrange the noble metal catalyst in a fixed bed and to pass the hot mixture of terephthalic acid, formic acid and water (which is at superatmospheric pressure) over the catalyst.

The process according to the invention, which is simple to carry out, gives a terephthalic acid of high purity; the content of 4-carboxybenzaldehyde (determined polarographically by a conventional method) is generally less than 25 p.p.m. and in many cases even less than 10 p.p.m. It is an advantage that the process according to the invention also removes from the terephthalic acid other impurities which lessen the color quality. The purified terephthalic acid obtained has a very good color quality. It is a further advantage that the catalyst has a long life and does not have to be constantly renewed and this is particularly favorable in continuous operation.

Owing to the exceptional purity of the terephthalic acid obtained according to the invention, it is particularly suitable for the production of filament-forming linear polyesters such as polyethylene terephthalate by direct esterification with glycols followed by polycondensation.

The following examples illustrate the invention.

EXAMPLE 1

A suspension in fully demineralized water of 5.7% by weight of terephthalic acid (TPA) containing 1400 p.p.m. of 4-carboxybenzaldehyde (4-CBA), 0.6% by weight of formic acid and 0.7% by weight of a 1% by weight platinum catalyst on carbon is heated to 240° C. in a closed vessel (an autoclave having a tantalum lining) so that the TPA dissolves completely and is shaken for two hours at this temperature. The mixture is filtered hot at superatmospheric pressure and then cooled. A colorless terephthalic acid separates out from the aqueous phase and is washed and dried. The content of 4-CBA is 4 p.p.m.

When the same TPA is treated according to the same process without adding formic acid and in contact with platinum on carbon, and is therefore recrystallized from water, the product contains 790 p.p.m. of 4-CBA. In a further experiment in which formic acid (0.6% by weight) is added but no noble metal catalyst is used, a content of 700 p.p.m. of 4-CBA is measured. If recrystallization from water is carried out in the presence of platinum on carbon (0.57% by weight), the TPA obtained contains 250 p.p.m. of 4-CBA.

The results are illustrated in Table 1.

TABLE 1

Purification of TPA having a content of 1,400 p.p.m. of 4-CBA in 5.7% by weight solution at 240° C.

| Experiment number | Formic acid (percent by weight) | Platinum on carbon (percent by weight) | 4-CBA (p.p.m.) |
|---|---|---|---|
| 1 | 0.6 | 0.57 | 4 |
| 2 | | | 790 |
| 3 | 0.6 | | 700 |
| 4 | | 0.57 | 250 |

EXAMPLE 2

The process of Example 1 is repeated but 0.1% by weight of formic acid is added, when a noble metal catalyst is used, it is a 10% by weight palladium catalyst on carbon.

Table 2 gives the results.

TABLE 2

Purification of TPA having a content of 1,400 p.p.m. of 4-CBA in 5.7% by weight solution at 240° C.

| Experiment number | Formic acid (percent by weight) | Palladium on carbon (percent by weight) | 4-CBA (p.p.m.) |
|---|---|---|---|
| 5 | 0.1 | 0.057 | 3 |
| 6 | | | 790 |
| 7 | 0.1 | | 700 |
| 8 | | 0.057 | 140 |

EXAMPLE 3

A mixture of 23% by weight of TPA (containing 1400 p.p.m. of 4-CBA), 0.1% by weight of formic acid, 2.3% by weight of a catalyst having 1% by weight of palladium on carbon and fully demineralized water as solvent is shaken in an autoclave for one hour at 275° C. Working up as described in Example 1 gives a colorless TPA having a 4-CBA content of 2 p.p.m.

COMPARATIVE EXPERIMENT

For comparison, Example 3 is repeated with the difference that 80% by weight aqueous acetic acid is used as solvent and no formic acid is added. TPA having 210 p.p.m. of 4-CBA is isolated.

We claim:
1. A process for the purification of crude terephthalic acid containing a small amount of 4-carboxybenzaldehyde by reductive treatment of an aqueous solution of crude terephthalic acid at elevated temperature, wherein an aqueous mixture containing from 5 to 45% by weight of crude terephthalic acid and 0.003 to 3% by weight of formic acid is heated at a temperature of 230° C. to 290° C. in contact with a noble metal of Group VIII of the Periodic Table as catalyst.

2. A process as claimed in claim 1 wherein the aqueous mixture contains from 10 to 30% by weight of terephthalic acid and from 0.01 to 1% by weight of formic acid.

3. A process as claimed in claim 1 wherein the noble metal catalyst is a platinum catalyst.

4. A process as claimed in claim 1 wherein the noble metal catalyst is a palladium catalyst.

5. A process as claimed in claim 1 wherein the noble metal of the catalyst is supported on carbon.

6. A process as claimed in claim 1 wherein the amount of said noble metal is 0.05 to 0.5% by weight with reference to the terephthalic acid.

7. A process for the purification of crude terephthalic acid containing a small amount of 4-carboxybenzaldehyde by reductive treatment of an aqueous solution of crude terephthalic acid at elevated temperature, wherein an aqueous mixture containing from 10 to 30% by weight of crude terephthalic acid and 0.01 to 1% by weight of formic acid is heated at a temperature of 230° C. to 290° C. in contact with 0.05 to 0.5% by weight with reference to the terephthalic acid of a catalyst, said catalyst being platinum or palladium supported on carbon.

References Cited

UNITED STATES PATENTS

| | | | |
|---|---|---|---|
| 3,456,001 | 7/1969 | Olson | 260—525 |
| 3,584,039 | 6/1971 | Meyer | 260—525 |
| 3,288,849 | 11/1966 | Meyer | 260—525 |
| 3,058,997 | 10/1962 | Taylor et al. | 260—525 |

FOREIGN PATENTS

| | | | |
|---|---|---|---|
| 786,897 | 11/1957 | Great Britain | 260—525 |

OTHER REFERENCES

Fieser et al., "Organic Chemistry," 1944, pp. 171–2.

LORRAINE A. WEINBERGER, Primary Examiner

R. D. KELLY, Assistant Examiner